US012670825B2

(12) United States Patent
Pan et al.

(10) Patent No.: US 12,670,825 B2
(45) Date of Patent: Jun. 30, 2026

(54) DISPLAY PANEL AND DISPLAY DEVICE

(71) Applicant: WUHAN CHINA STAR OPTOELECTRONICS TECHNOLOGY CO., LTD., Wuhan (CN)

(72) Inventors: You Pan, Wuhan (CN); Qiang Gong, Wuhan (CN)

(73) Assignee: WUHAN CHINA STAR OPTOELECTRONICS TECHNOLOGY CO., LTD., Wuhan (CN)

( * ) Notice: Subject to any disclaimer, the term of this patent is extended or adjusted under 35 U.S.C. 154(b) by 0 days.

(21) Appl. No.: 19/039,923

(22) Filed: Jan. 29, 2025

(65) Prior Publication Data

US 2025/0191508 A1 Jun. 12, 2025

Related U.S. Application Data

(63) Continuation of application No. 18/555,196, filed as application No. PCT/CN2023/113220 on Aug. 16, 2023, now Pat. No. 12,243,461.

(30) Foreign Application Priority Data

Aug. 10, 2023 (CN) ......................... 202311008330.0

(51) Int. Cl.
*G09G 3/20* (2006.01)

(52) U.S. Cl.
CPC ........... *G09G 3/20* (2013.01); *G09G 2300/08* (2013.01); *G09G 2310/0254* (2013.01); *G09G 2310/08* (2013.01); *G09G 2320/0247* (2013.01)

(58) Field of Classification Search
CPC ................. G09G 3/20; G09G 2300/08; G09G 2310/0254; G09G 2310/08; G09G 2320/0247
(Continued)

(56) References Cited

U.S. PATENT DOCUMENTS

2005/0190176 A1 9/2005 Tomitani
2015/0035819 A1 2/2015 Kim et al.
(Continued)

FOREIGN PATENT DOCUMENTS

CN 107591143 A 1/2018
CN 110085189 A 8/2019
(Continued)

OTHER PUBLICATIONS

International Search Report issued in International Application No. PCT/CN2023/113220, mailed on Feb. 4, 2024, with English translation.
(Continued)

*Primary Examiner* — Mark Edwards
(74) *Attorney, Agent, or Firm* — HSML P.C.

(57) ABSTRACT

A display panel, for displaying images including a first frame and a second frame, includes subpixels, scan lines, data lines, and a compensation module. The data lines are configured to input a first data voltage to the subpixels in a display period of the first frame and to input a second data voltage to the subpixels in a display period of the second frame. The compensation module is configured to input a first compensation voltage to the subpixels in a blank period of the first frame and to input a second compensation voltage to the subpixels in a blank period of the second frame, where the first compensation voltage is not zero, and the second compensation voltage is not zero.

18 Claims, 6 Drawing Sheets

(58) Field of Classification Search
USPC .......................................................... 345/209
See application file for complete search history.

(56) References Cited

U.S. PATENT DOCUMENTS

| | | | |
|---|---|---|---|
| 2017/0193959 A1 | 7/2017 | No et al. | |
| 2021/0375213 A1 | 12/2021 | Gao et al. | |
| 2022/0223095 A1 | 7/2022 | Zhang et al. | |
| 2022/0328013 A1 | 10/2022 | Roh et al. | |
| 2024/0363084 A1* | 10/2024 | Tian | G09G 3/3648 |

FOREIGN PATENT DOCUMENTS

| | | | | |
|---|---|---|---|---|
| CN | 113658565 A | * | 11/2021 | G09G 3/36 |
| CN | 114019737 A | | 2/2022 | |
| CN | 114724512 A | | 7/2022 | |
| CN | 115497428 A | | 12/2022 | |
| CN | 115731873 A | | 3/2023 | |
| CN | 116189628 A | | 5/2023 | |
| CN | 116343695 A | | 6/2023 | |
| JP | H03219288 A | * | 9/1991 | |
| JP | 2002103590 A | | 4/2002 | |
| JP | 2003219288 A | | 7/2003 | |
| JP | 2005017528 A | | 1/2005 | |
| JP | 2005115395 A | | 4/2005 | |
| JP | 2005309282 A | | 11/2005 | |
| JP | 2006259224 A | | 9/2006 | |
| JP | 2010152261 A | | 7/2010 | |
| KR | 20210083946 A | | 7/2021 | |
| WO | 2023050127 A1 | | 4/2023 | |

OTHER PUBLICATIONS

Written Opinion issued in International Application No. PCT/CN2023/113220, mailed on Feb. 4, 2024, with English translation.

Office Action issued in corresponding German Patent Application No. 11 2023 000 039.5 dated Jun. 11, 2024, with English translation, 16 pages provided.

International Search Report in International application No. PCT/CN2023/113220, mailed Feb. 4, 2024, with English translation.

Written Opinion of the International Search Authority in International application No. PCT/CN2023/113220, mailed Feb. 4, 2024, with English translation.

German Office Action issued in corresponding German Patent Application No. 11 2023 000 039.5, dated Jun. 11, 2024, with English translation.

Chinese Office Action issued in corresponding Chinese Patent Application No. 202311008330.0, dated Sep. 10, 2025, with English machine translation.

Japanese Office Action issued in corresponding Japanese Patent Application No. 2023-568102, dated Sep. 9, 2025, with English machine translation.

Indian Office Action issued in corresponding Indian Patent Application No. 202327076427, dated Mar. 24, 2026, pp. 1-7, with English translation.

* cited by examiner

DISPLAY PANEL AND DISPLAY DEVICE

CROSS-REFERENCE TO RELATED APPLICATION

This is a continuation application of U.S. patent application Ser. No. 18/555,196 which is a US National Stage Application of International Patent Application NO. PCT/CN2023/113220, filed on Aug. 16, 2023, which claims priority to Chinese Patent Application No. 202311008330.0 filed with the China National Intellectual Property Administration (CNIPA) on Aug. 10, 2023, disclosures of which are incorporated by reference in their entireties.

TECHNICAL FIELD

The present disclosure relates to the field of display technology, specifically relates to a display panel and a display device.

BACKGROUND

In an existing display panel, the polarity of the data voltage input to the subpixel is reversed in two consecutive displays. Due to the leakage of the source and drain of the switching transistor, the brightness of the subpixels gradually decreases after the scanning of the first frame of the display is completed. After entering the second frame of the display screen, due to the input of data voltage of opposite polarity to the sub-pixel, the voltage difference between the source and drain of the switching transistor increases, the leakage speed of the source and drain increases, and the brightness of the subpixel continues to decrease until the pixel brightness increases significantly after the next scan. Therefore, the brightness of the display panel in the two consecutive display frames of the display screen changes greatly, resulting in the problem of flickering of the display panel.

SUMMARY

Some embodiments of the present disclosure provide a display panel and a display device.

Some embodiments of the present disclosure provide a display panel for displaying images including a first frame and a second frame. The display panel includes multiple subpixels, multiple scan lines, multiple data lines, and a compensation module. The scan lines are arranged in a first direction and connected to the sub-pixels. The data lines are arranged in a second direction crossing the first direction, connected to the sub-pixels, and configured to input a first data voltage to the subpixels in a display period of the first frame and to input a second data voltage to the subpixels in a display period of the second frame. The compensation module is electrically connected to the data lines, and configured to input a first compensation voltage to the subpixels in a blank period of the first frame and to input a second compensation voltage to the subpixels in a blank period of the second frame. The first compensation voltage is not zero, and the second compensation voltage is not zero. A polarity of the first data voltage input to the subpixels in the display period of the first frame is opposite to a polarity of the second data voltage input to the subpixels in the display period of the second frame. A polarity of the first compensation voltage is the same as the polarity of the first data voltage, and a polarity of the second compensation voltage is the same as the polarity of the second data voltage. n absolute value of the first compensation voltage is less than or equal to an absolute value of the first data voltage, and an absolute value of the second compensation voltage is less than or equal to an absolute value of the second data voltage.

Some embodiments of the present disclosure provide a display device. The display device includes a frame body and a display panel for displaying images including a first frame and a second frame. The display panel includes multiple subpixels, multiple scan lines, multiple data lines, and a compensation module. The scan lines are arranged in a first direction and connected to the sub-pixels. The data lines are arranged in a second direction crossing the first direction, connected to the sub-pixels, and configured to input a first data voltage to the subpixels in a display period of the first frame and to input a second data voltage to the subpixels in a display period of the second frame. The compensation module is electrically connected to the data lines, and configured to input a first compensation voltage to the subpixels in a blank period of the first frame and to input a second compensation voltage to the subpixels in a blank period of the second frame. The first compensation voltage is not zero, and the second compensation voltage is not zero. A polarity of the first data voltage input to the subpixels in the display period of the first frame is opposite to a polarity of the second data voltage input to the subpixels in the display period of the second frame. A polarity of the first compensation voltage is the same as the polarity of the first data voltage, and a polarity of the second compensation voltage is the same as the polarity of the second data voltage. n absolute value of the first compensation voltage is less than or equal to an absolute value of the first data voltage, and an absolute value of the second compensation voltage is less than or equal to an absolute value of the second data voltage.

DETAILED DESCRIPTION

The technical solution in the embodiment of the present disclosure will be described below in conjunction with the accompanying drawings in the embodiments of the present disclosure. The described technical solution is only used to explain and illustrate the ideas of the present disclosure and should not be regarded as a limitation of the scope of protection of the present disclosure.

The embodiments provided in the present disclosure are similar, and the features in different embodiments are combined with each other.

Figure 1:
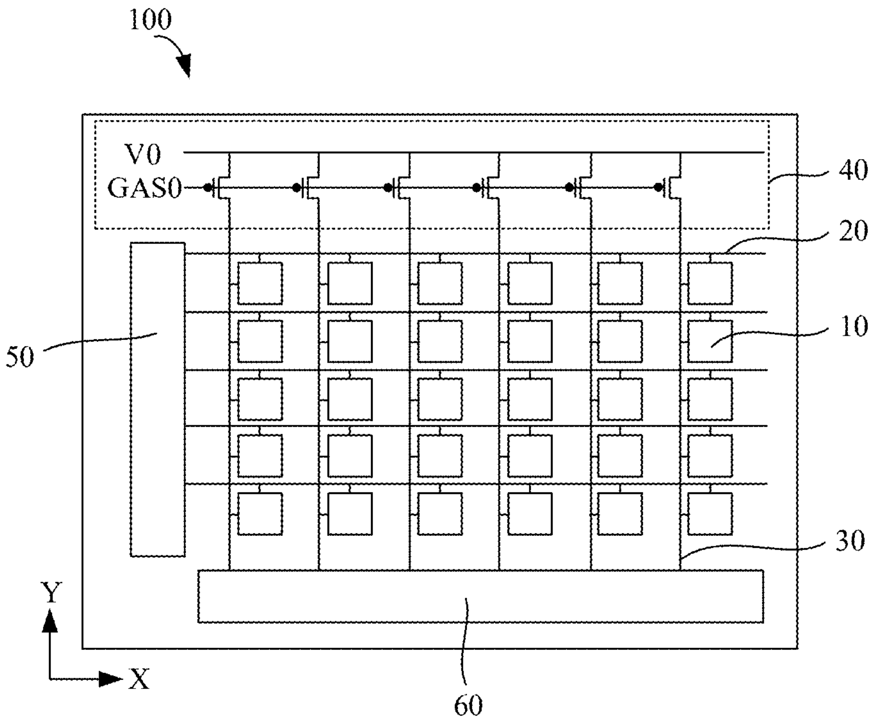
FIG. 1 is a schematic diagram of the display panel according to a first embodiment of the present disclosure.

As illustrated in FIG. 1, embodiments of the present disclosure provide a display panel 100. The display panel 100 displays a first display and a second frame in sequence. The display panel 100 includes a plurality of subpixels 10, a plurality of scan lines 20, a plurality of data lines 30 and a compensation module 40. The plurality of scan lines 20 are arranged in the first direction Y, and electrically connected to the plurality of subpixels 10. The plurality of data lines 30 are arranged in the second direction X crossing the first direction Y. The plurality of scan lines 20 are electrically connected to a plurality of sub-pixels 10. The polarity of the first data voltage input to the subpixel 10 in the display period of the first frame is opposite to the polarity of the second data voltage input to the subpixel 10 during the display period of the second frame.

The compensation module 40 is electrically connected to the plurality of data lines 30. The compensation module 40 is used to input a first compensation voltage to the subpixel 10 in the blank period of the first frame and a second compensation voltage to the subpixel 10 in the blank period of the second frame. The polarity of the first compensation voltage is the same as the polarity of the first data voltage. The polarity of the second compensation voltage is the same as the polarity of the second data voltage. The first compensation voltage is not zero, and the second compensation voltage is not zero.

The display panel 100 is electrically connected to the plurality of data lines 30 through the compensation module 40. When the display panel 100 displays the first frame and the second frame is sequence, the compensation module 40 transmits the first compensation voltage to the subpixel 10 in the blank period of the first frame and transmits the second compensation voltage to the subpixel 10 in the blank period of the second frame, so that the potential of the subpixel 10 remains stable, improving the problem that the brightness of the subpixel 10 is significantly reduced due to serious leakage after the end of the scan and before the next scan, and the brightness increases significantly after the next scan of the subpixel 10, causing the brightness of the display panel to change greatly in the two frames of the display image displayed continuously, resulting in the problem of flickering of the display panel.

In an embodiment of the present disclosure, the compensation module 40 includes a compensation voltage output terminal V0. The compensation voltage output terminal V0 is electrically connected to the plurality of data lines 30. The compensation voltage output terminal V0 is used to output a first compensation voltage and a second compensation voltage. The absolute value of the first compensation voltage is less than or equal to the absolute value of the first data voltage, and the absolute value of the second compensation voltage is greater than or equal to the absolute value of the second data voltage.

Specifically, the first data voltage is a positive polarity data voltage. For example, the first data voltage is 2 volts. The first compensation voltage is greater than 0 volts and less than or equal to 2 volts. For example, the first compensation voltage is 1.5 volts. When the first data voltage is a negative polarity data voltage, e.g., 2 volts, then the first compensation voltage is less than 0 volts and greater than or equal to −2 volts. For example, the first compensation voltage is −1.5 volts.

The absolute value of the first compensation voltage is equal to the absolute value of the second compensation voltage.

In an embodiment of the present disclosure, the compensation module 40 comprises a plurality of switching transistors T0. The gate of the switching transistor T0 is electrically connected to the global control signal terminal GAS0. A first input terminal of the switching transistor T0 is electrically connected to the compensation voltage output terminal V0, and the source and drain of the switching transistor T0 are electrically connected to one end of the data line 30.

In an embodiment of the present disclosure, the display panel further comprises a gate drive circuit 50 and a source drive circuit 60, the gate drive circuit 50 is electrically connected to a plurality of scan lines 20, and the gate drive circuit 50 is used to provide a scanning signal to the subpixel 10. The source driver circuit 60 is electrically connected to the other end of a plurality of data lines 30, and the source driver circuit 60 is used to provide a data voltage to the subpixel 10.

In an embodiment of the present disclosure, in the blank period, the turned-on time of the switching transistor T0 is greater than or equal to the off-time.

Figure 2:
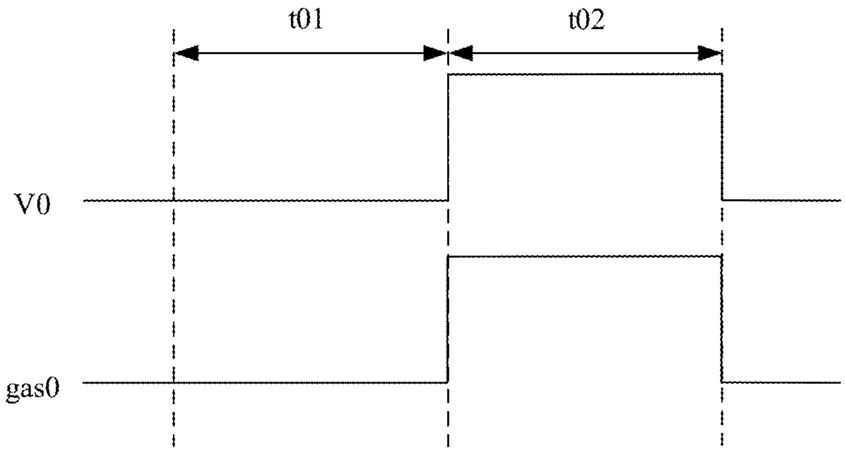
FIG. 2 is a first type of driving timing diagram of the display panel according to an embodiment of the present disclosure.

As illustrated in FIG. 1 and FIG. 2, during the display period t01, the global control signal terminal GAS0 enters the global control signal gas0 with low potential. In the blank period t02, the global control signal terminal GAS0 enters the global control signal gas0 with high potential. The switching transistor T0 is continuously on during the blank period T02.

Figure 3:
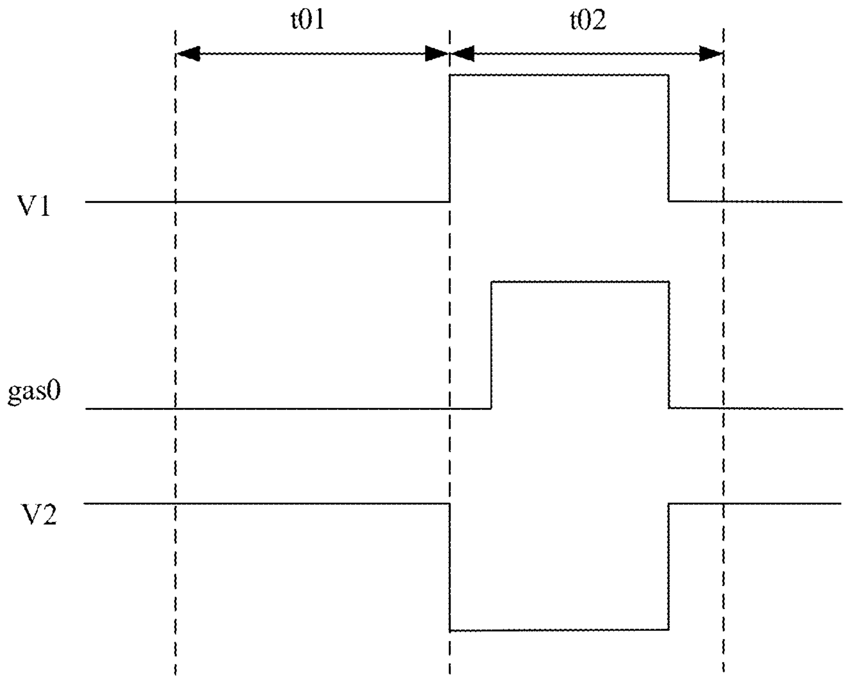
FIG. 3 is a second driving timing diagram of the display panel according to an embodiment of the present disclosure.

As illustrated in FIG. 1 and FIG. 3, during the display period t01, the global control signal terminal GAS0 enters the global control signal gas0 with low potential. During part of the blank period t02, the global control signal terminal GAS0 enters the global control signal gas0 with high potential. The switching transistor T0 is turned on under the control of the high-potential global control signal gas0. Among them, part of the period in the blank period T02 includes any period in the blank period T02.

Figure 4:
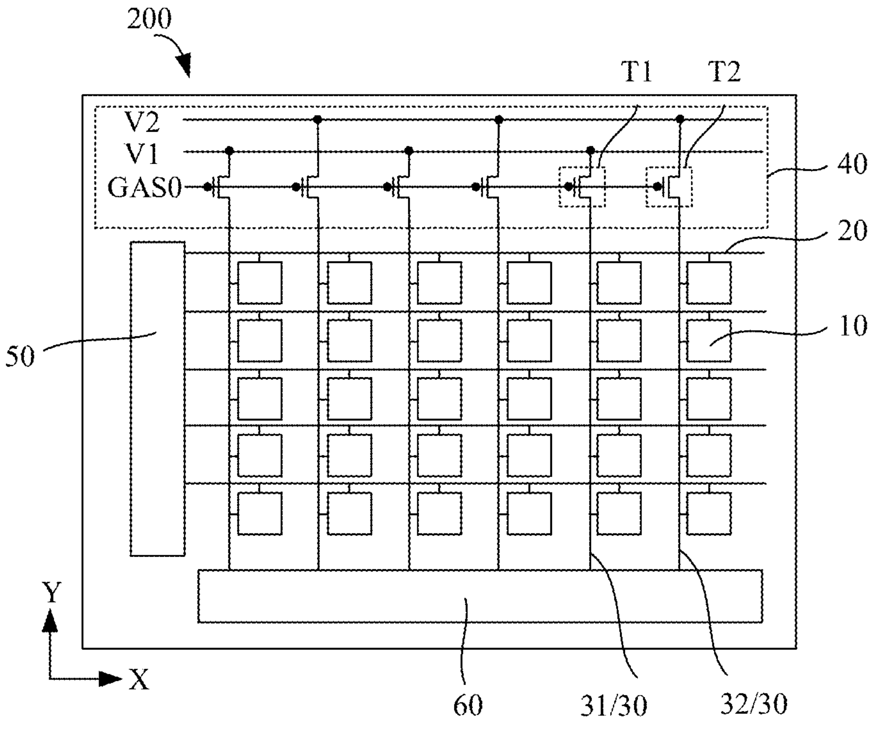
FIG. 4 is a schematic diagram of the display panel provided in the second embodiment of the present disclosure.

As illustrated in FIG. 4, embodiments of the present disclosure provide a display panel 200. Differing from the display panel 100, in the display panel 200, a plurality of data lines 30 include a plurality of first data lines 31 and a plurality of second data lines 32. The compensation module 40 includes a first compensation voltage output terminal V1, a second compensation voltage output terminal V2, a plurality of first switching transistors T1 and a plurality of second switching transistors T2. The first compensation voltage output terminal V1 and the first switching transistor T1 and the first data line 31 electrically connected, the second compensation voltage output terminal V2 and the second switching transistor T2 and the second data line 32 electrically connected.

Specifically, the display panel 200 displays a first and second frame, the display panel 200 comprises: a plurality of subpixels 10, a plurality of scan lines 20, a plurality of data lines 30 and compensation module 40. A plurality of scan lines 20 are arranged in the first direction Y, and a plurality of scan lines 20 are electrically connected to a plurality of subpixels 10. A plurality of data lines 30 are arranged in the second direction X, the first direction Y crosses with the second direction X, a plurality of scan lines 20 are electrically connected to a plurality of sub-pixels 10, the polarity of the first data voltage input to the subpixel 10 in the display period of the first frame 30 is opposite to the polarity of the second data voltage input to the subpixel 10 during the display period of the second display.

A plurality of data lines 30 includes a plurality of first data lines 31 and a plurality of second data lines 32, a plurality of first data lines 31 and a plurality of second data lines 32 are alternately disposed along the second direction X. The first data voltage includes the first positive polarity data voltage and the first negative polarity data voltage, in the display period of the first frame, the data voltage of the first data line 31 input subpixel 10 is the first positive polarity data voltage, and the data voltage of the second data line 32 input subpixel 10 is the first negative polarity data voltage. The second data voltage includes the second positive polarity data voltage and the second negative polarity data voltage, in the display period of the second frame, the data voltage of the first data line 31 input subpixel 10 is the second negative polarity data voltage, and the data voltage of the second data line 32 input subpixel 10 is the second positive polarity data voltage.

In an embodiment of the present disclosure, the compensation module 40 comprises a first compensation voltage output terminal V1 and a second compensation voltage output terminal V2, the first compensation voltage output terminal V1 is electrically connected to the first data line 31, the first compensation voltage includes a first positive polarity compensation voltage and a first negative polarity compensation voltage, the first positive polarity compensation voltage is less than or equal to the first positive polarity data voltage, and the first negative polarity compensation voltage is greater than or equal to the first negative polarity data voltage. For example, if the first positive polarity data voltage is 2 volts, the first positive polarity compensation voltage is greater than 0 volts and less than or equal to 2 volts, for example, the first positive polarity compensation voltage is 1.5 volts. If the first negative polarity data voltage is −2 volts, then the first negative polarity compensation voltage is less than 0 volts and greater than or equal to −2 volts, for example, the first negative polarity compensation voltage is −1.5 volts.

The second compensation voltage output terminal V2 is electrically connected to the second data line 32. The second compensation voltage includes the second positive polarity compensation voltage and the second negative polarity compensation voltage. The second positive polarity compensation voltage is less than or equal to the second positive polarity data voltage, and the second negative polarity compensation voltage is greater than or equal to the second negative polarity data voltage.

When the second positive polarity data voltage is 2 volts, the second positive polarity compensation voltage is greater than 0 volts and less than or equal to 2 volts, for example, the second positive polarity compensation voltage is 1 volt. If the second negative polarity data voltage is −2 volts, then the second negative polarity compensation voltage is less than 0 volts and greater than or equal to −2 volts, for example, the second negative polarity compensation voltage is −1 volt.

In an embodiment of the present disclosure, the compensation module 40 comprises a plurality of first switching transistors T1 and a plurality of second switching transistors T2, the gates of a plurality of first switching transistors T1 and the gates of a plurality of second switching transistors T2 are electrically connected to the global control signal terminal GAS0. One of the source and drain of the first switching transistor T1 is electrically connected to the first compensation voltage output terminal V1, and the source and drain of the first switching transistor T1 are electrically connected to one end of the first data line 31. One of the source and drain of the second switching transistor T2 is electrically connected to the second compensation voltage output terminal V2, and the source and drain of the second switching transistor T2 are electrically connected to one end of the second data line 32.

In an embodiment of the present disclosure, the first switching transistor T1 and the second switching transistor T2 are off during the display period, and the first switching transistor T1 and the second switching transistor T2 are turned on in the blank period.

Figure 5:
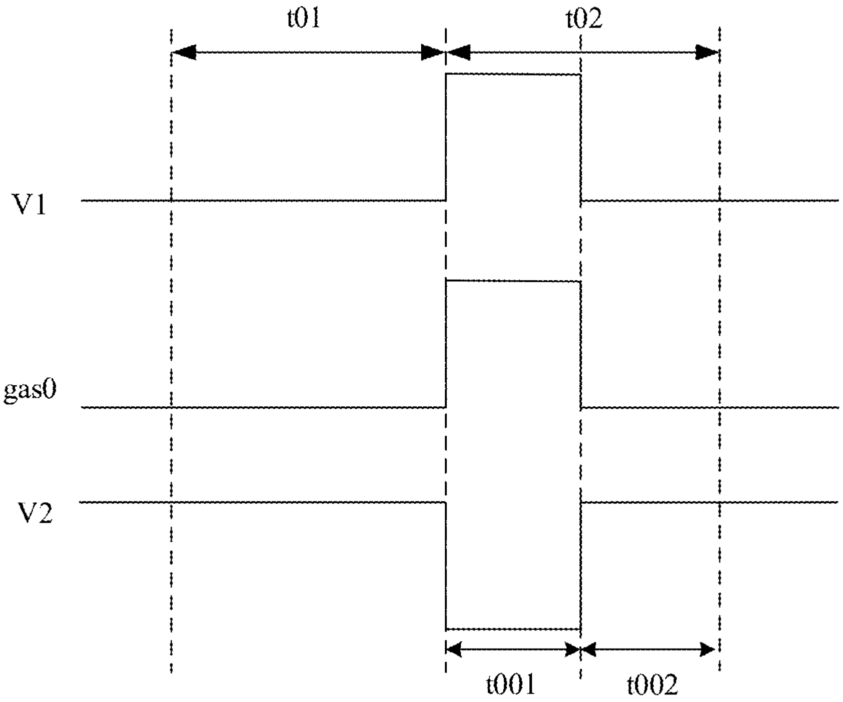
FIG. 5 is a third driving timing diagram of the display panel according to an embodiment of the present disclosure.

As illustrated in FIG. 5, the global control signal terminal GAS0 enters the low-potential global control signal gas0 during the display period t01, and the first switch transistor T1 and the second switch transistor T2 are turned off. The blank period T02 includes the first blank sub-period T001 and the second blank sub-period T002, the first blank sub-period T001 is adjacent to the second blank sub-period T002, and the duration of the first blank sub-period T001 is equal to the duration of the second blank sub-period T002. The global control signal terminal GAS0 enters the high-potential global control signal gas0 in the first blank sub-period t001, and the first switching transistor T1 and the second switching transistor T2 are turned on in the first blank sub-period t001. The global control signal terminal GAS0 enters the low-potential global control signal gas0 in the second blank sub-period t002, and the first switching transistor T1 and the second switching transistor T2 are turned off in the second blank sub-period t002.

Figure 6:
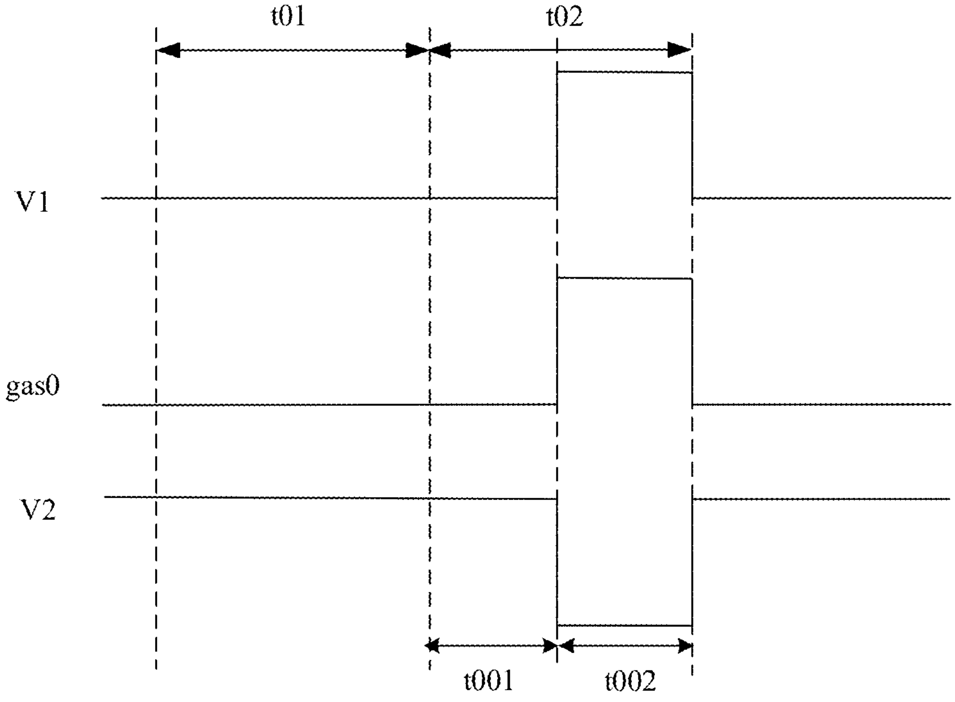
FIG. 6 is a fourth driving timing diagram of the display panel according to an embodiment of the present disclosure.

As illustrated in FIG. 6, the global control signal terminal GAS0 enters the low-potential global control signal gas0 during the display period t01, and the first switch transistor T1 and the second switch transistor T2 are turned off. The blank period T02 includes the first blank sub-period T001 and the second blank sub-period T002, the first blank sub-period T001 is adjacent to the second blank sub-period T002, and the duration of the first blank sub-period T001 is equal to the duration of the second blank sub-period T002. The global control signal terminal GAS0 enters the low-potential global control signal gas0 in the first blank sub-period t001, and the first switching transistor T1 and the second switching transistor T2 are turned off in the first blank sub-period t001. The global control signal terminal GAS0 enters the high-potential global control signal gas0 in the second blank sub-period t002, and the first switching transistor T1 and the second switching transistor T2 are turned on in the second blank sub-period t002.

Figure 7:
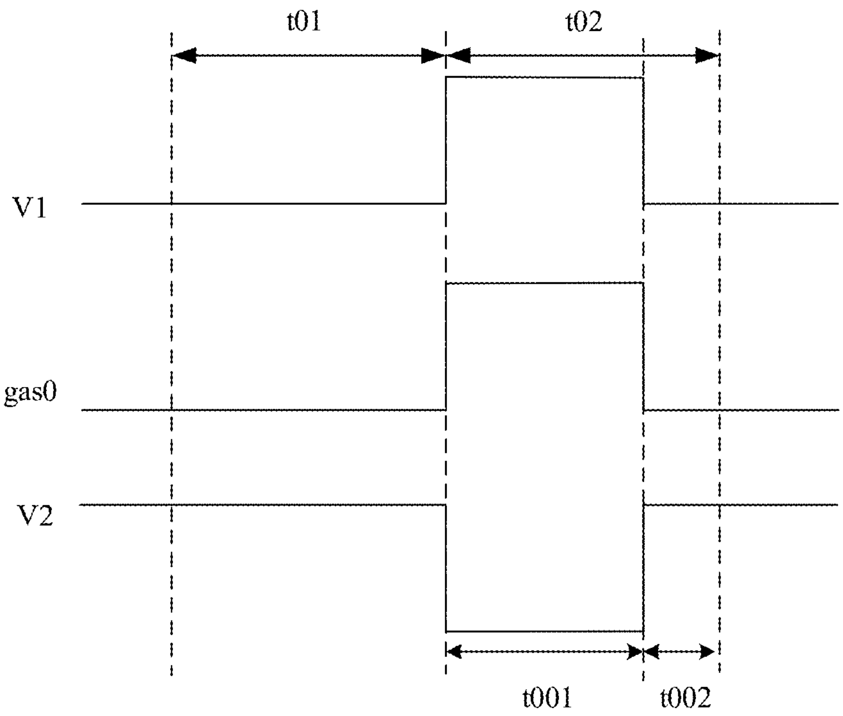
FIG. 7 is a fifth driving timing diagram of the display panel according to an embodiment of the present disclosure.

As illustrated in FIG. 7, the turned-on time of the first switching transistor T1 and the second switching transistor T2 is greater than the off-time during the blank period t02. To ensure that the subpixel on the data line electrically connected to the first switch transistor T1 receives the compensation voltage for a long enough time, so as to improve the stability of the subpixel potential and the subpixel on the data line electrically connected to the second switch transistor T2 to receive the compensation voltage for a long enough duration to improve the stability of the subpixel potential.

Specifically, the blank period T02 includes the first blank sub-period T001 and the second blank sub-period T002, and the first blank sub-period T001 and the second blank sub-period T002 are adjacent to each other, where the duration of the first blank sub-period T001 is greater than the duration of the second blank sub-period T002.

In an embodiment of the present disclosure, the global control signal terminal GAS0 enters the global control signal gas0 with low potential during the display period t01, and the first switching transistor T1 and the second switching transistor T2 are turned off. The blank period includes the first blank sub-period t001 and the second blank sub-period t002, the first blank sub-period T001 is adjacent to the second blank sub-period t002, the global control signal terminal GAS0 enters the high-potential global control signal gas0 in the first blank sub-period t001, the first switch transistor T1 and the second switch transistor T2 are turned on in the first blank sub-period t001. The global control signal terminal GAS0 enters the low-potential global control signal gas0 in the second blank sub-period t002, and the first switching transistor T1 and the second switching transistor T2 are turned off in the second blank sub-period t002.

Alternatively, if the duration of the second blank sub-period t002 is greater than the duration of the first blank sub-period t001, then both the first switching transistor T1 and the second switching transistor T2 are turned on at the second blank sub-period t002 and closed at the first blank sub-period t001.

Figure 8:
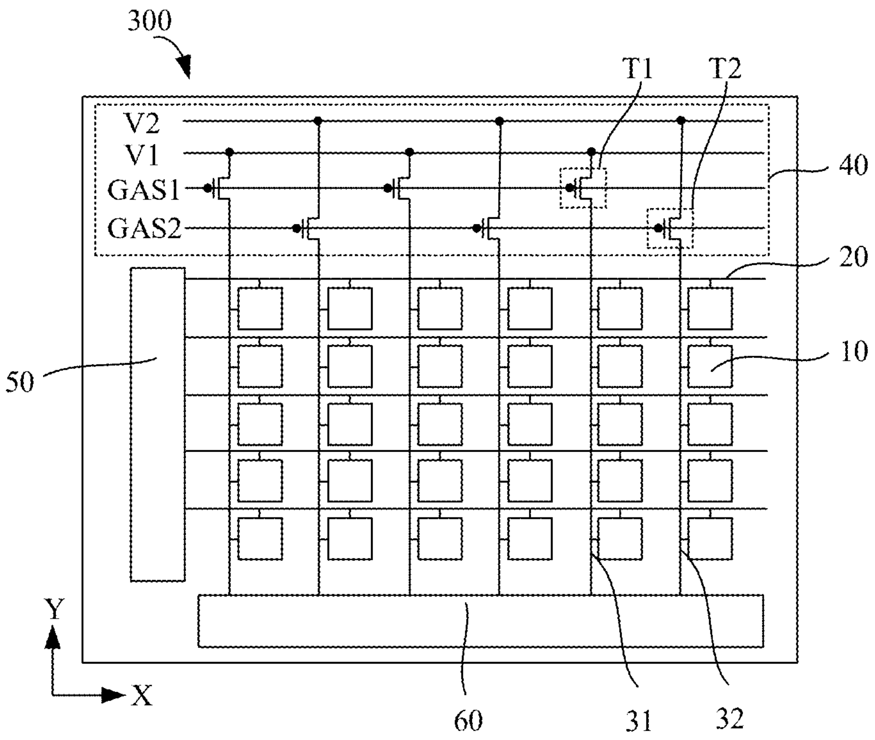
FIG. 8 is a schematic diagram of the display panel according to a third embodiment of the present disclosure.

As illustrated in FIG. 8, embodiments of the present disclosure provide a display panel 300, the difference between the display panel 300 and the display panel 200 is: a plurality of first switching transistor T1 gate and the first control signal terminal GAS1 electrically connected, plurality of second switching transistor T2 gate and second control signal terminal GAS2 electrically connected.

Specifically, the compensation module 40 includes a plurality of first switching transistors T1 and a plurality of second switching transistors T2, the gate of a plurality of first switching transistors T1 is electrically connected to the first control signal terminal GAS1, and the gate of a plurality of second switching transistor T2 is electrically connected to the second control signal terminal GAS2. One of the source and drain of the first switching transistor T1 is electrically connected to the first compensation voltage output terminal V1, and the source and drain of the first switching transistor T1 are electrically connected to one end of the first data line 31. One of the source and drain of the second switching transistor T2 is electrically connected to the second compensation voltage output terminal V2, and the source and drain of the second switching transistor T2 are electrically connected to one end of the second data line 32.

Other structures of the display panel 300 are the same as other structures in the display panel 200.

As illustrated in FIG. 8, the first switching transistor T1 and the second switching transistor T2 are of the same type, and the first switching transistor T1 is both N-type transistors.

Figure 9:
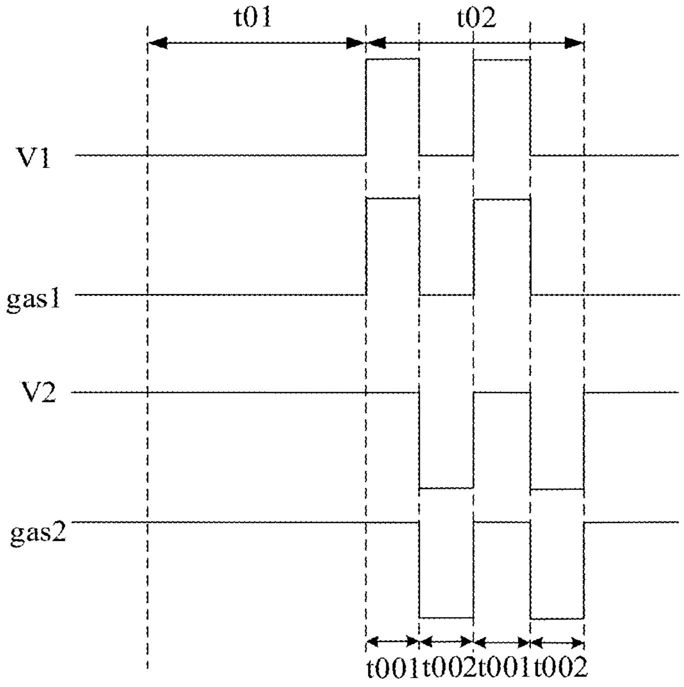
FIG. 9 is a sixth driving timing diagram of the display panel according to an embodiment of the present disclosure.

As illustrated in FIG. 9, the blank period includes a plurality of first blank sub-periods t001 and a plurality of second blank sub-periods t002, the first blank sub-period T001 alternates with the second blank sub-period T002, the first switching transistor T1 is turned on in multiple first blank sub-periods t001, and the second switching transistor T2 is turned on in multiple second blank sub-periods t002.

Specifically, the first control signal terminal GAS1 enters the first control signal gas1 with low potential during the display period, and the first switching transistor T1 is turned off. The second control signal terminal GAS2 enters the second control signal gas2 with low potential during the display period, and the second switch transistor T2 is turned off. The first control signal terminal GAS1 inputs the first control signal gas1 of high potential in multiple first blank sub-periods t001, and the first switching transistor T1 conducts in multiple first blank sub-periods t001. The first control signal terminal GAS1 inputs the first control signal gas1 of low potential in multiple second blank sub-periods t002, and the first switching transistor T1 is turned off in multiple second blank sub-periods t002. The second control signal terminal GAS2 inputs the high potential second control signal gas2 in multiple second blank sub-periods t002, and the second switching transistor T2 conducts in multiple second blank sub-periods t002. The second control signal terminal GAS2 enters the second control signal gas2 at a low potential in multiple first blank sub-periods t001, and the second switch transistor T2 is turned off at multiple first blank sub-periods t001.

Figure 10:
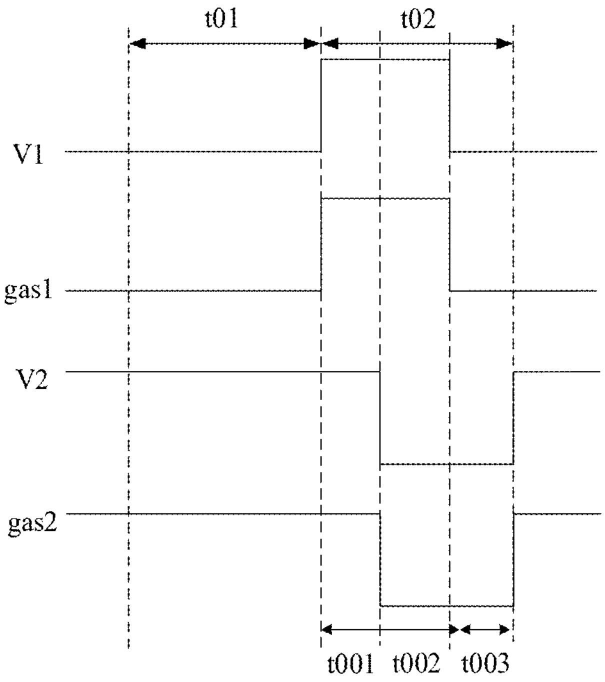
FIG. 10 is a seventh driving timing diagram of the display panel according to an embodiment of the present disclosure.

As illustrated in FIG. 10, the blank period includes the first blank sub-period T001, the second blank sub-period T002, and the third blank sub-period T003, and the second blank sub-period T002 is located between the first blank sub-period T001 and the third blank sub-period T003. The first switching transistor T1 conducts in the first blank sub-period t001 and the second blank sub-period t002, and the second switching transistor T2 conducts at the second blank sub-period t002 and the third blank sub-period t003.

Specifically, the first control signal terminal GAS1 enters the first control signal gas1 with low potential during the display period, the second control signal terminal GAS2 enters the second control signal gas2 with low potential during the display period, and the first switch transistor T1 and the second switch transistor T2 are turned off. The first control signal terminal GAS1 enters the first control signal gas1 with high potential in the first blank sub-period t001 and the second blank sub-period t002, and the first switching transistor T1 is turned on. The first control signal terminal GAS1 enters the first control signal gas1 with low potential in the third blank sub-period t003, and the first switching transistor T1 is turned off. The second control signal terminal GAS2 enters the second control signal gas2 with low potential in the first blank sub-period t001, and the second switch transistor T2 is turned off. The second control signal terminal GAS2 enters the second control signal gas2 with high potential in the second blank sub-period t002 and the third blank sub-period t003, and the second switching transistor T2 is turned on.

Figure 11:
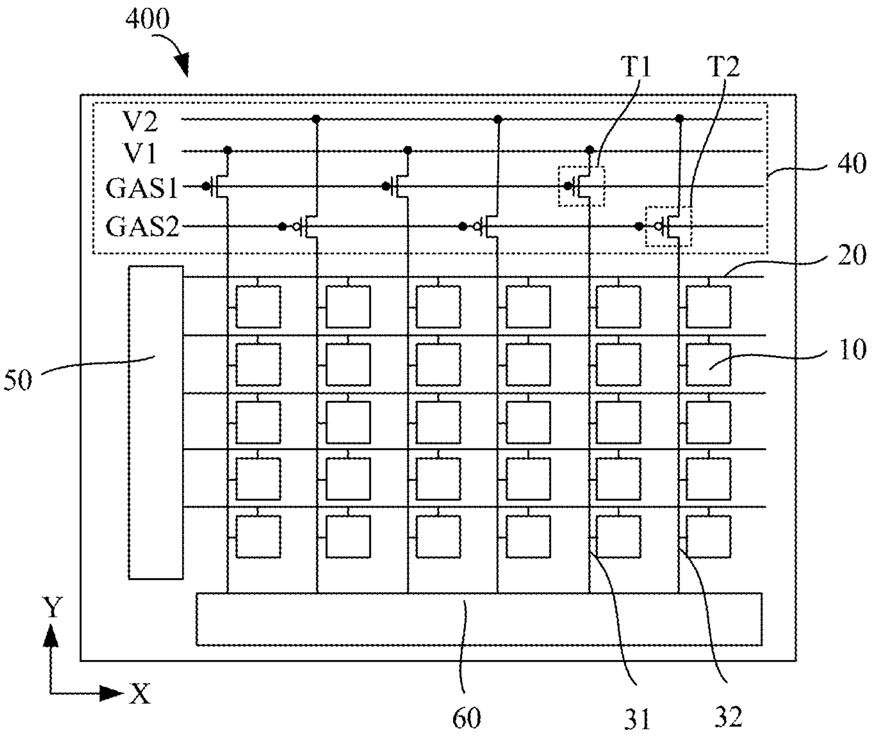
FIG. 11 is a schematic diagram of the display panel according to the fourth embodiment of the present disclosure.

As illustrated in FIG. 11, embodiments of the present disclosure provide a display panel 400, the difference between the display panel 400 and the display panel 300 is: a first switching transistor T1 and a second switching transistor T2 is an N-type transistor, a first switching transistor T1 and a second switching transistor T2 in the other is a P-type transistor. In order to realize the diversity of circuit settings in the compensation module 40, for example, the first switch transistor T1 and the second switch transistor T2 may be electrically connected to the first control signal terminal GAS1 and the second control signal terminal GAS2, respectively, or electrically connected with the same control signal terminal, thereby reducing the space occupied by the compensation module 40 and the number of signal lines.

Other structures of the display panel 400 are the same as other structures of the display panel 300.

An embodiment of the present disclosure also provides a display device, the display device comprises a display panel and a frame, the display panel is disposed in the frame.

The above embodiments of the present disclosure provide a display panel and display device in detail, the above embodiment description is only to help understand the core idea of the present disclosure, and the above description should not be understood as a limitation of the scope of protection of the present disclosure.

The above embodiments of the present disclosure provide a display panel and a display device. The display panel and display device can solve the problem that the brightness of the display panel in the two consecutive display frames of the display screen changes greatly, resulting in the display panel flickering.

The display panel and display device provided by the embodiments of the present disclosure are electrically connected to the plurality of data lines by setting a compensation module, and input the first compensation voltage to the subpixel in the blank period of the first frame and the first frame in the second frame in a continuous display and the second compensation voltage into the subpixel in the blank period of the second frame, reduce the voltage difference between the source and drain corresponding to the subpixel in the blank period, so that the potential of the subpixel remains stable, slows down the leakage, and alleviates the obvious reduction of the brightness of the subpixel due to serious leakage after the end of the scan to the next scan, and after the next scan of the sub-pixel, the brightness increases significantly, causing the brightness of the display panel to change greatly in the two consecutive display frames, resulting in the problem of flickering of the display panel to improve the display effect.

What is claimed is:

1. A display panel, for displaying images comprising a first frame and a second frame, the display panel comprising:

a plurality of subpixels;

a plurality of scan lines, arranged in a first direction and connected to the plurality of sub-pixels;

a plurality of data lines, arranged in a second direction crossing the first direction, connected to the plurality of sub-pixels, and configured to input a first data voltage to the subpixels in a display period of the first frame and to input a second data voltage to the subpixels in a display period of the second frame; and a compensation module, electrically connected to the plurality of data lines, and configured to input a first compensation voltage to the subpixels in a blank period of the first frame and to input a second compensation voltage to the subpixels in a blank period of the second frame, wherein the first compensation voltage is not zero, and the second compensation voltage is not zero;

wherein a polarity of the first data voltage input to the subpixels in the display period of the first frame is opposite to a polarity of the second data voltage input to the subpixels in the display period of the second frame; a polarity of the first compensation voltage is the same as the polarity of the first data voltage, and a polarity of the second compensation voltage is the same as the polarity of the second data voltage;

wherein an absolute value of the first compensation voltage is less than or equal to an absolute value of the first data voltage, and an absolute value of the second compensation voltage is less than or equal to an absolute value of the second data voltage;

wherein the compensation module comprises a plurality of first switching transistors and a plurality of second switching transistors; and wherein the first switching transistors and the second switching transistors are turned off in the display periods, and the first switching transistors and the second switching transistors are turned on in the blank periods.

2. The display panel according to claim 1, wherein the plurality of data lines comprise a plurality of first data lines and a plurality of second data lines alternately disposed along the second direction;

the first data voltage comprises a first positive polarity data voltage and a first negative polarity data voltage; in the display period of the first frame, a data voltage input by the first data lines to the subpixels being the first positive polarity data voltage, and a data voltage input by the second data lines to the subpixels being the first negative polarity data voltage;

the second data voltage comprises a second positive polarity data voltage and a second negative polarity data voltage; in the display period of the second frame, a data voltage input by the first data lines to the subpixels being the second negative polarity data voltage, and a data voltage input by the second data lines to the subpixels being the second positive polarity data voltage.

3. The display panel according to claim 2, wherein the compensation module comprises:

a first compensation voltage output terminal, connected to the first data lines; and a second compensation voltage output terminal, connected to the second data lines;

wherein the first compensation voltage comprises a first positive polarity compensation voltage and a first negative polarity compensation voltage, the first positive polarity compensation voltage is less than or equal to the first positive polarity data voltage, and the first negative polarity compensation voltage is greater than or equal to the first negative polarity data voltage;

wherein the second compensation voltage comprises a second positive polarity compensation voltage and a second negative polarity compensation voltage, the second positive polarity compensation voltage is less than or equal to the second positive polarity data voltage, and the second negative polarity compensation voltage is greater than or equal to the second negative polarity data voltage.

4. The display panel according to claim 3, wherein each of the plurality of first switching transistors comprises a gate electrically connected to a global control signal terminal, a first input terminal electrically connected to the first compensation voltage output terminal, and a second input terminal electrically connected to a respective one of the first data lines; and each of the plurality of second switching transistors comprises a gate electrically connected to the global control signal terminal, a first input terminal electrically connected to the second compensation voltage output terminal, and a second input terminal electrically connected to a respective one of the second data lines.

5. The display panel according to claim 4, wherein each of the blank periods comprises a first blank sub-period and a second blank sub-period adjacent to the first blank sub-period;

wherein the first switching transistors and the second switching transistors are turned on in the first blank sub-period, and the first switching transistors and the second switching transistors are turned off in the second blank sub-period; or the first switching transistors and the second switching transistors are turned on in the second blank sub-period, and the first switching transistors and the second switching transistors are turned off in the first blank sub-period.

6. The display panel according to claim 5, wherein during the blank periods, turned-on time of the first switching transistors and the second switching transistors is greater than turned-off time of the first switching transistors and the second switching transistors.

7. The display panel according to claim 3, wherein
each of the plurality of first switching transistors comprises a gate electrically connected to a first control signal terminal, a first input terminal electrically connected to the first compensation voltage output terminal, and a second input terminal electrically connected to a respective one of the first data lines; and
each of the plurality of second switching transistors comprises a gate electrically connected to a second control signal terminal, a first input terminal electrically connected to the second compensation voltage output terminal, and a second input terminal electrically connected to a respective one of the second data lines.

8. The display panel according to claim 7, wherein each of the blank periods comprises a first blank sub-period, a second blank sub-period, and a third blank sub-period, and the second blank sub-period is between the first blank sub-period and the third blank sub-period;
the first switching transistors are turned on in the first blank sub-period and the second blank sub-period, the first switching transistors are turned off in the third blank sub-period, the second switching transistors are turned on in the second blank sub-period and the third blank sub-period, and the second switching transistors are turned off in the first blank sub-period.

9. The display panel according to claim 7, wherein each of the blank periods comprises a plurality of first blank sub-periods and a plurality of second blank sub-periods, and the first blank sub-periods and the second blank sub-periods alternate;
the first switching transistors are turned on in the plurality of first blank sub-periods, and the first switching transistors are turned off in the plurality of second blank sub-periods; the second switching transistors are turned on in the plurality of second blank sub-periods, and the second switching transistors are turned off in the plurality of the first blank sub-periods.

10. A display device, comprising a frame body and a display panel for displaying images comprising a first frame and a second frame, the display panel comprising:
a plurality of subpixels;
a plurality of scan lines, arranged in a first direction and connected to the plurality of sub-pixels;
a plurality of data lines, arranged in a second direction crossing the first direction, connected to the plurality of sub-pixels, and configured to input a first data voltage to the subpixels in a display period of the first frame and to input a second data voltage to the subpixels in a display period of the second frame; and
a compensation module, electrically connected to the plurality of data lines, and configured to input a first compensation voltage to the subpixels in a blank period of the first frame and to input a second compensation voltage to the subpixels in a blank period of the second frame, wherein the first compensation voltage is not zero, and the second compensation voltage is not zero;
wherein a polarity of the first data voltage input to the subpixels in the display period of the first frame is opposite to a polarity of the second data voltage input to the subpixels in the display period of the second frame; a polarity of the first compensation voltage is the same as the polarity of the first data voltage, and a polarity of the second compensation voltage is the same as the polarity of the second data voltage;
wherein an absolute value of the first compensation voltage is less than or equal to an absolute value of the first data voltage, and an absolute value of the second compensation voltage is less than or equal to an absolute value of the second data voltage;
wherein the compensation module comprises a plurality of first switching transistors and a plurality of second switching transistors; and
wherein the first switching transistors and the second switching transistors are turned off in the display periods, and the first switching transistors and the second switching transistors are turned on in the blank periods.

11. The display device according to claim 10, wherein the plurality of data lines comprise a plurality of first data lines and a plurality of second data lines alternately disposed along the second direction;
the first data voltage comprises a first positive polarity data voltage and a first negative polarity data voltage; in the display period of the first frame, a data voltage input by the first data lines to the subpixels being the first positive polarity data voltage, and a data voltage input by the second data lines to the subpixels being the first negative polarity data voltage;
the second data voltage comprises a second positive polarity data voltage and a second negative polarity data voltage; in the display period of the second frame, a data voltage input by the first data lines to the subpixels being the second negative polarity data voltage, and a data voltage input by the second data lines to the subpixels being the second positive polarity data voltage.

12. The display device according to claim 11, wherein the compensation module comprises:
a first compensation voltage output terminal, connected to the first data lines; and
a second compensation voltage output terminal, connected to the second data lines;
wherein the first compensation voltage comprises a first positive polarity compensation voltage and a first negative polarity compensation voltage, the first positive polarity compensation voltage is less than or equal to the first positive polarity data voltage, and the first negative polarity compensation voltage is greater than or equal to the first negative polarity data voltage;
wherein the second compensation voltage comprises a second positive polarity compensation voltage and a second negative polarity compensation voltage, the second positive polarity compensation voltage is less than or equal to the second positive polarity data voltage, and the second negative polarity compensation voltage is greater than or equal to the second negative polarity data voltage.

13. The display device according to claim 12, wherein
each of the plurality of first switching transistors comprises a gate electrically connected to a global control signal terminal, a first input terminal electrically connected to the first compensation voltage output terminal, and a second input terminal electrically connected to a respective one of the first data lines; and
each of the plurality of second switching transistors comprises a gate electrically connected to the global control signal terminal, a first input terminal electrically connected to the second compensation voltage output terminal, and a second input terminal electrically connected to a respective one of the second data lines.

14. The display device according to claim 13, wherein each of the blank periods comprises a first blank sub-period and a second blank sub-period adjacent to the first blank sub-period;

wherein the first switching transistors and the second switching transistors are turned on in the first blank sub-period, and the first switching transistors and the second switching transistors are turned off in the second blank sub-period; or the first switching transistors and the second switching transistors are turned on in the second blank sub-period, and the first switching transistors and the second switching transistors are turned off in the first blank sub-period.

15. The display device according to claim 14, wherein during the blank periods, turned-on time of the first switching transistors and the second switching transistors is greater than turned-off time of the first switching transistors and the second switching transistors.

16. The display device according to claim 12, wherein each of the plurality of first switching transistors comprises a gate electrically connected to a first control signal terminal, a first input terminal electrically connected to the first compensation voltage output terminal, and a second input terminal electrically connected to a respective one of the first data lines; and each of the plurality of second switching transistors comprises a gate electrically connected to a second control signal terminal, a first input terminal electrically connected to the second compensation voltage output terminal, and a second input terminal electrically connected to a respective one of the second data lines.

17. The display device according to claim 16, wherein each of the blank periods comprises a first blank sub-period, a second blank sub-period, and a third blank sub-period, and the second blank sub-period is between the first blank sub-period and the third blank sub-period;

the first switching transistors are turned on in the first blank sub-period and the second blank sub-period, the first switching transistors are turned off in the third blank sub-period, the second switching transistors are turned on in the second blank sub-period and the third blank sub-period, and the second switching transistors are turned off in the first blank sub-period.

18. The display device according to claim 16, wherein each of the blank periods comprises a plurality of first blank sub-periods and a plurality of second blank sub-periods, and the first blank sub-periods and the second blank sub-periods alternate;

the first switching transistors are turned on in the plurality of first blank sub-periods, and the first switching transistors are turned off in the plurality of second blank sub-periods; the second switching transistors are turned on in the plurality of second blank sub-periods, and the second switching transistors are turned off in the plurality of the first blank sub-periods.

* * * * *